United States Patent
Hara (10) Patent No.: US 10,163,458 B2
(45) Date of Patent: Dec. 25, 2018

(54) MAGNETIC DISK DEVICE AND WRITE METHOD

(71) Applicant: Kabushiki Kaisha Toshiba, Minato-ku, Tokyo (JP)

(72) Inventor: Takeyori Hara, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 15/255,292

(22) Filed: Sep. 2, 2016

(65) Prior Publication Data

US 2017/0186455 A1   Jun. 29, 2017

(30) Foreign Application Priority Data

Dec. 28, 2015 (JP) .................................. 2015/256892

(51) Int. Cl.
*G11B 5/00* (2006.01)
*G11B 5/596* (2006.01)
*G11B 5/012* (2006.01)

(52) U.S. Cl.
CPC .......... *G11B 5/59627* (2013.01); *G11B 5/012* (2013.01)

(58) Field of Classification Search
CPC ........... G11B 5/00; G11B 27/36; G11B 20/18; G11B 15/04; G11B 19/04; G11B 20/00086; G11B 19/00; G11B 15/6895; G11B 5/54; G11B 5/59633; G11B 5/59638; G11B 19/045; G11B 2020/1869; G11B 5/59627; G11B 5/012

USPC ............................ 360/31, 53, 55, 69, 60, 75
See application file for complete search history.

(56) References Cited

U.S. PATENT DOCUMENTS

| | | |
|---|---|---|
| 7,394,607 B2 | 7/2008 | Ohno et al. |
| 8,587,889 B2 | 11/2013 | Kawabe |
| 8,854,751 B2 | 10/2014 | Rub |
| 8,885,284 B2 | 11/2014 | Kashiwagi et al. |
| 9,679,601 B2 * | 6/2017 | Gao .................. G11B 20/1833 |
| 2004/0190188 A1 | 9/2004 | Zaitsu |
| 2014/0118857 A1 | 5/2014 | Kashiwagi et al. |
| 2015/0294690 A1 | 10/2015 | Kanamaru et al. |

FOREIGN PATENT DOCUMENTS

| | | |
|---|---|---|
| JP | 2007-73138 A | 3/2007 |
| JP | 2015-204123 A | 11/2015 |

* cited by examiner

*Primary Examiner* — Nabil Hindi
(74) *Attorney, Agent, or Firm* — White & Case LLP

(57) ABSTRACT

According to one embodiment, a magnetic disk device includes a memory, a disk including track groups each including overlapping tracks, a head including a write head, and a read head, and a controller configured to write first position data, including a first position error of the write head with respect to a first target track, to the memory and a second recording area subsequent to a first recording area to which first data is written, when writing the first data to the track groups, to read the first position data from the memory or the second recording area when adding data after writing the first data, and to control a position of the write head based on the first position data.

20 Claims, 8 Drawing Sheets

| Priority | Band number | Position data | | Addition count | Residual amount of band area | Time-stamp | Prioritization value |
|---|---|---|---|---|---|---|---|
| | | Other data | Position error data | | | | |
| 1 (Highest) | BA2 | TCI2 | PEI2 | 50 | 100S | 9990T | 100x |
| 2 | BA13 | TCI13 | PEI13 | 20 | 200S | 9900T | 93x |
| 3 | BA10 | TCI10 | PEI10 | 30 | 50S | 9900T | 90x |
| 4 | BA7 | TCI7 | PEI7 | 15 | 70S | 9900T | 87x |
| 5 | BA1 | TCI1 | PEI1 | 20 | 70S | 0T | 83x |
| : | : | : | : | : | : | : | : |
| j (Lowest) | BA20 | TCI20 | PEI20 | 3 | 20S | 9000T | 30x |

MAGNETIC DISK DEVICE AND WRITE METHOD

CROSS-REFERENCE TO RELATED APPLICATIONS

This application is based upon and claims the benefit of priority from Japanese Patent Application No. 2015-256892, filed Dec. 28, 2015, the entire contents of which are incorporated herein by reference.

FIELD

Embodiments described herein relate generally to a magnetic disk device and a method of writing.

BACKGROUND

Various techniques have been recently developed for realizing magnetic disk devices having high storage capacity (such as HDDs). One of these techniques is a recording technique called shingled-write magnetic recording (SMR) or shingled-write recording (SWR). In a magnetic disk device of shingled-write magnetic recording, a track is written so that it overlaps an adjacent track written immediately before the first-mentioned track. The track density (tracks per inch [TPI]) can be improved by adopting shingled-write magnetic recording.

In the case of an HDD realizing standard recording, the distance (trackwidth) between adjacent tracks is determined from the width of a write head (write core). In the case of an HDD realizing shingled-write magnetic recording, the trackwidth does not depend upon the width of the write core, but upon an area where adjacent tracks overlap each other. Accordingly, in the HDD realizing shingled-write magnetic recording, it is important to control narrowing of the trackwidth due to the positioning error of the center of the head with respect to a target path.

Therefore, in the HDD realizing shingled-write magnetic recording, a trackwidth control function for suppressing narrowing of the trackwidth has been proposed. For example, a function (dynamic drift-off level [DDOL]) of inhibiting a data write operation when the offset exceeds a threshold determined from the positioning error of an adjacent track, or a function (automatic trackwidth control [ATC]) of setting the target path of a track based on positioning error data of an adjacent track to which data has been written, has been proposed. In the trackwidth control function, such as DDOL or ATC, when data is written, position data including a position error corresponding to one or two already written tracks is stored in a memory.

In a magnetic disk device realizing shingled-write magnetic recording, when the trackwidth control function, such as DDOL or ATC, is executed on respective multi-streams, it is difficult to manage position data items corresponding to a plurality of bands, using only a memory. Further, in the magnetic disk device realizing shingled-write magnetic recording, when data is newly added immediately after already written data, using the trackwidth control function, such as DDOL or ATC, it is difficult to manage position data items corresponding to a plurality of bands, using only a memory.

DETAILED DESCRIPTION

In general, according to one embodiment, a magnetic disk device comprises: a memory; a disk comprising a plurality of track groups each comprising a plurality of overlapping tracks; a head comprising a write head configured to write data to the plurality of track groups, and a read head configured to read data from the plurality of track groups; and a controller configured to write first position data, comprising a first position error of the write head with respect to a first target track, to the memory and a second recording area subsequent to a first recording area to which first data is written, when writing the first data to the track groups; to read the first position data from the memory or the second recording area when adding data after writing the first data; and to control a position of the write head based on the first position data.

An embodiment will be described with reference to the accompanying drawings.

Embodiment

Figure 1:
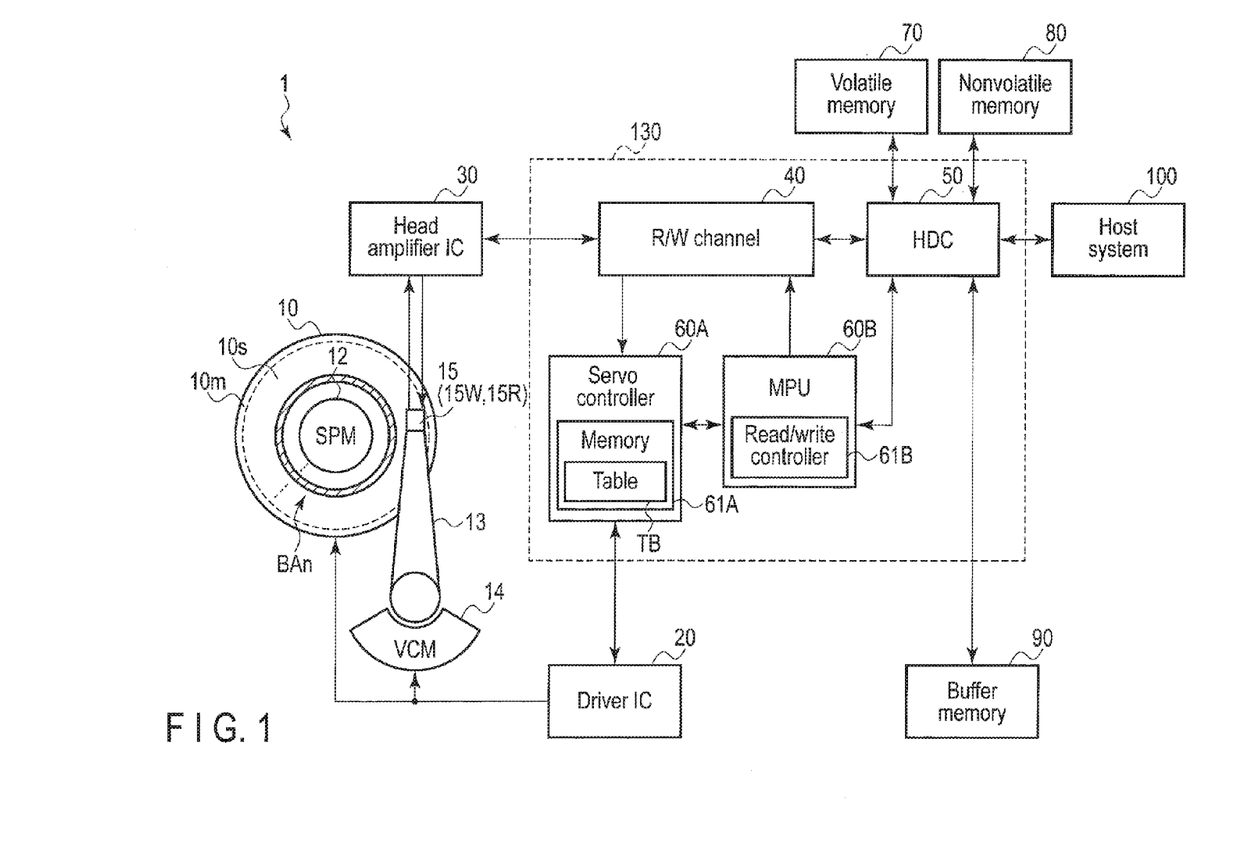
FIG. 1 is a block diagram showing the configuration of a magnetic disk device according to an embodiment.

FIG. 1 is a block diagram showing the configuration of a magnetic disk device 1 according to the embodiment.

The magnetic disk device 1 comprises a head disk assembly (HDA), described later, a driver IC 20, a head amplifier integrated circuit (hereinafter, referred to as a head amplifier IC) 30, a volatile memory 70, a nonvolatile memory 80, a buffer memory (buffer) 90, and a system controller 130 that consists of a single-chip integrated circuit. The magnetic disk device 1 may be connected to a host system (host) 100. The magnetic disk device 1 of the embodiment may be a host-managed HDD that has its format of shingled-write magnetic recording recognized by the host 100 and has its data write/read controlled by the host 100, or may be a standard drive-managed HDD.

The HDA comprises a magnetic disk (hereinafter, referred to simply as a disk) 10, a spindle motor (SPM) 12, an arm 13 with a head 15 mounted thereon, and a voice coil motor (VCM) 14. The disk 10 is rotated by the spindle motor 12. The arm 13 and the VCM 14 constitute an actuator. The actuator moves the head 15 on the arm 13 to a particular position on the disk 10 in accordance with the rotation of the VCM 14. Two or more disks 10 and heads 15 may be employed.

The disk 10 has a data area, to which a shingled-write magnetic recording area (SMR area) 10s and a media cache area 10m are allocated. User data, for example, which has been requested to write by the host 100, is recorded in the SMR area 10s. The media cache area 10m may be used as a cache for the SMR area 10s.

The SMR area 10s is a higher track-density area than the media cache area 10m, since data in a subsequent track is written to a preceding track adjacent to the former (hereinafter, this preceding track will be referred to simply as an adjacent track) to overlap the data or tire adjacent track. The SMR area 10s comprises a plurality of track groups (hereinafter, referred to as a band area BAn) each including one or more tracks (first tracks), the data of each of which overlaps the data of an adjacent track, and a track (second track) whose data lastly overlaps an adjacent track (i.e., the last first track). The second track has a wider distance (hereinafter, referred to as a trackwidth) from an adjacent track (last first track) than the distance between adjacent ones of the first tracks. The band area BAn comprises the track groups, each track extending through one circumference of the disk 10. The path (track) of the head 15 assumed when writing data will hereinafter be referred to as a write track, and the remaining portion of the write track, which is obtained by excluding an area, where adjacent tracks overlap each other in shingled-write magnetic recording, will be referred to as a read track. The write track and the read track may also be referred to simply as tracks.

Figure 2:
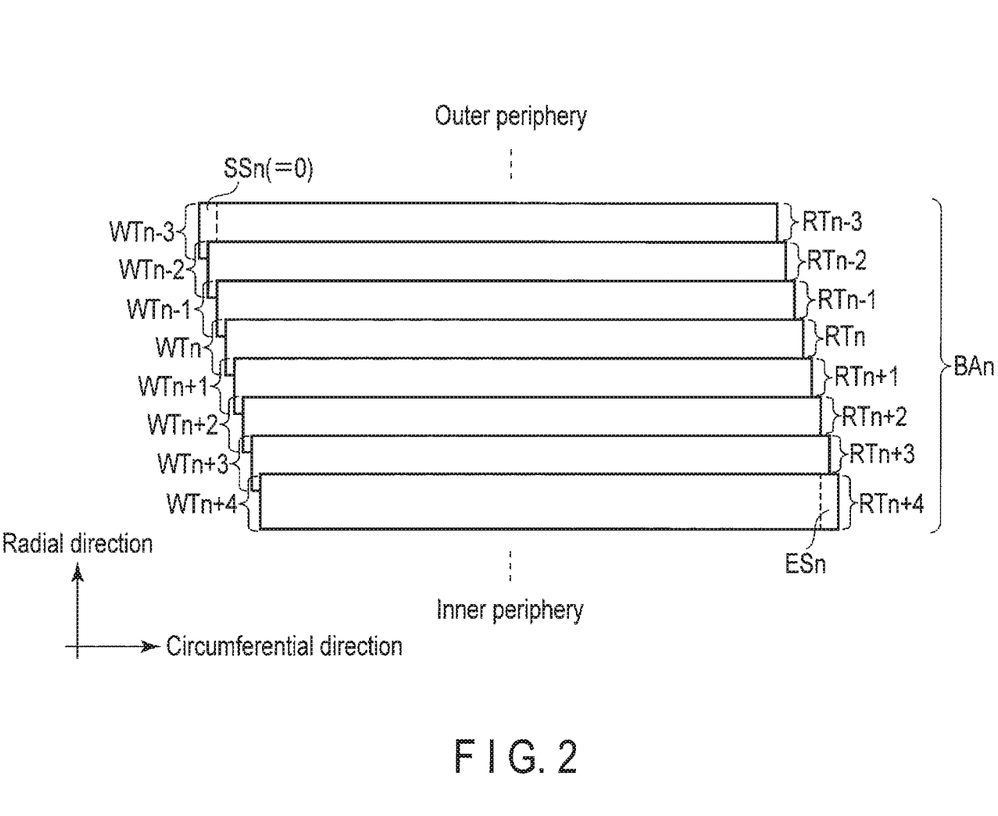
FIG. 2 is a schematic view showing an example of a band area.

FIG. 2 is a schematic diagram showing an example of the band area BAn. FIG. 2 shows write tracks WTn−3, WTn−2, WTn−1, WTn, WTn+1, WTn+2, WTn+3 and WTn+4, read tracks RTn−3 and RTn−2, RTn−1, RTn, RTn+1, RTn+2, RTn+3 and RTn+4. Further, FIG. 2 shows the start sector SSn and the end sector ESn of the band area BAn. In FIG. 2, the band area BAn is shown along the radial direction of the disk 10 and along the circumferential direction of the disk 10. Furthermore, in FIG. 2, the outer and inner peripheries of the band area BAn are indicated.

As shown in FIG. 2, the band area BAn is formed by overlapping a plurality of write tracks WTn−3 to WTn+4 one on another. In the band area BAn, the recording areas other than those in which write tracks WTn−2 to WTn+4 overlap serve as read tracks RTn−3 to RTn+4.

The read head 15R reads data currently wrote on the data tracks of the disk 10. The write head 15W writes data to the disk 10. The write head 15W generates a magnetic field perpendicular to the surface of the disk 10.

The driver IC 20 controls the driving operations of the SPM 12 and the VCM 14 under control of the system controller 130 (more specifically, a servo controller 60A which will be described later in detail).

The head amplifier IC 30 has a read amplifier and a write driver. The read amplifier amplifies a read signal output from the read head 15R, and transmits it to a read/write (R/W) channel 40. The write driver transmits, to the write head 15W, a write current corresponding to write data output from the R/W channel 40.

The volatile memory 70 is a semiconductor memory in which saved data is lost when the supply of electric power is interrupted. The volatile memory 70 stores, for example, data required for processing in each component part of the magnetic disk device 1. For instance, the volatile memory 70 is a synchronous dynamic random access memory (SDRAM).

The nonvolatile memory 80 is a semiconductor memory that holds saved data even if the supply of electric power is interrupted. The nonvolatile memory 80 is, for example, a flash read only memory (RROM).

The buffer memory 90 is a semiconductor memory that temporarily holds, for example, data transmitted between the disk 10 and the host 100. The buffer memory 90 may be formed integral with the volatile memory 70 as one body. The buffer memory 90 is formed of, for example, a dynamic random access memory (DRAM), a static random access memory (SRAM), an SDRAM, a ferroelectric random access memory (FeRAM), and a magnetoresistive random access memory (MRAM).

The system controller (controller) 130 is realized using, for example, a large-scale integrated circuit (LSI) that consists of a plurality of elements on a single chip and called a system-on-a-chip (SoC). The system controller 130 includes an R/W channel 40, a hard disk controller (HDC) 50, a servo controller 60A, and a microprocessor (MPU) 60B. The servo controller 60A and the MPU 60B may be formed integral as one body.

The R/W channel 40 performs signal processing of read data and write data. The R/W channel 40 has a circuit or a function for measuring the signal quality of read data. Moreover, the R/W channel 40 acquires data on access to the disk 10. The access data includes position data of the head 15 (hereinafter, referred to simply as position data), the number of data writes to a particular band area, the position of the last data sector in the particular band area, the time when data was written to the particular band area, etc. The position data includes a position error. The position error is an error (deviation) in the path of the center of the write head 15W with respect to a target path (target track).

The HDC 50 manages data transfer between the host system 100 and the R/W channel 40 under control of the MPU 60B. The HDC 50 includes a host interface circuit connected to the host 100.

The servo controller 60A controls the VCM 14 through the driver IC 20 based on data received from the R/W channel 40. The servo controller 60A realizes, for example, the position control of the head 15, data writing and reading of the head 15 through the MPU 60B.

The servo controller 60A comprises an internal memory 61A. The servo controller 60A sets a prioritization value for defining the priority of a write to the memory 61A, based on access data acquired from the R/W channel 40. The servo controller 60A writes, to the memory 61A as a table TB, access data acquired from the R/W channel 40 and the prioritization value. The table TB is a storage area of a particular limit capacity, such as a ring buffer. The table TB may be written to a recording medium other than the memory 61A, such as the volatile memory 70 and the buffer memory 90. Further, the servo controller 60A transmits the acquired position data to the MPU 60B.

Figure 3:
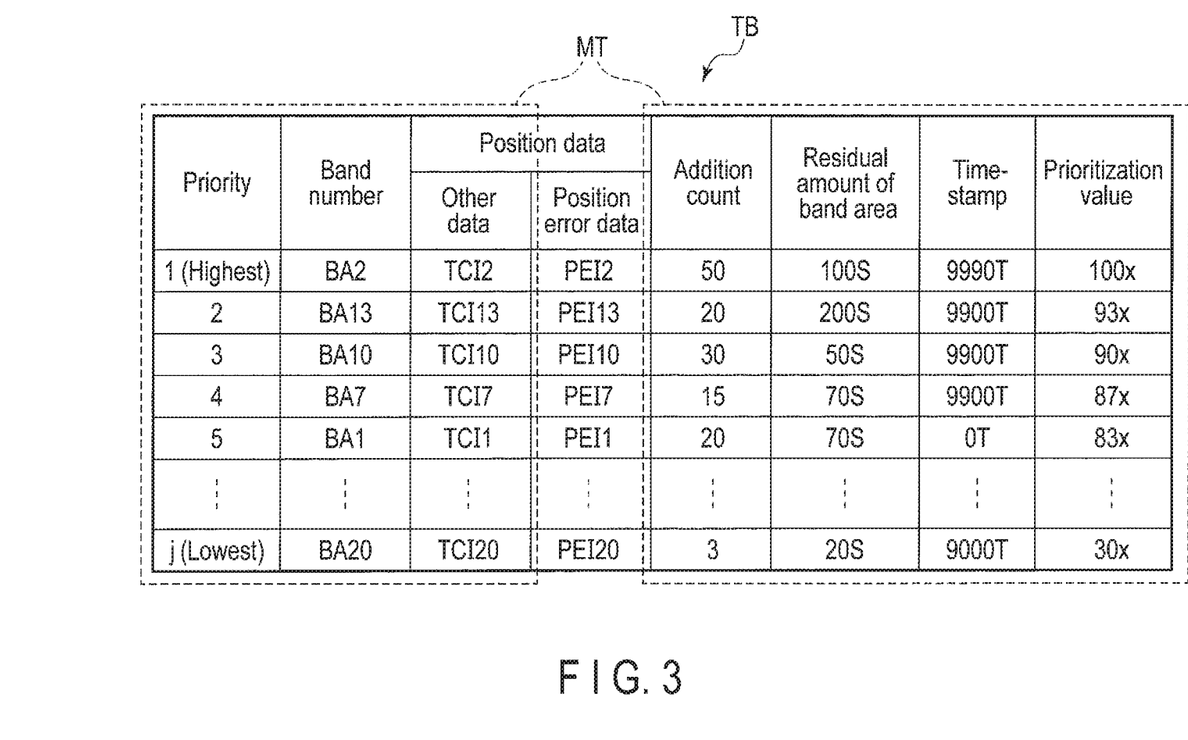
FIG. 3 is a schematic view showing an example of a table.

FIG. 3 is a schematic view showing an example of the table TB. In FIG. 3, the priority represents the order of priority in which data is stored in the memory 61A. That is, the priority indicates that data of higher priority is stored in the memory 61A in preference to data of lower priority. The position data is the position data of the head 15 that includes, for example, position error data in a corresponding band area. The position error data is associated with a position error in a corresponding band area. The position error has a data size corresponding to, for example, an error corresponding to the servo sectors of one track. The band number represents a number allocated for identifying to each band area of a recording region 11a. The number of additional writes represents the number of times data was added to the particular band area, or represents the generation number of data added in the particular band area. The residual amount of the band area represents the capacity of remaining data, the number of remaining sectors, or the number of remaining cylinders in the particular band area. The time stamp indicates the time when a last write was made in each band. From a current time and the time stamp, an elapsed time is calculated. The elapsed time represents the time having elapsed from the time when last data was written to the particular band area. Assume in FIG. 3 that data other than position error data, such as priority data, band number data, position data, additional write data, data indicating the amount of residual data in the band area, elapsed time data, prioritization value data, etc., is management table MT data. Further, the position data may also refer to position error data.

The prioritization value is a value for defining the priority as mentioned above. The greater the prioritization value, the greater the priority. A higher prioritization value is set for data as the possibility of access to this data is higher. The prioritization value is set based on, for example, the number of additional writes, the remaining size of the band area in FIG. 3, and the elapsed time. For example, the prioritization value is set higher, as the remaining size of the band area and the number of additional writes is greater. Further, the prioritization value is set lower, as the elapsed time is greater.

If the amount of data stored in the table TB exceeds an allowable amount, the servo controller 60A or R/W controller 61B deletes data associated with a band area of the lowest priority. For instance, when the servo controller 60A or R/W controller 61B stores data associated with a new band area in the table TB, if the resultant data amount exceeds the allowable amount, the prioritization value of the data associated with the new band area is compared with each of the prioritization values of data associated with the other band areas currently written to the table TB. If there is a prioritization value associated with a band area, which is lower than that associated with the new band area of a lower priority than the new band area, the servo controller 60A or R/W controller 61B deletes data associated with the band area of the lowest prioritization value, and stores the data of the new band area in the table TB with a priority corresponding to the prioritization value.

The servo controller 60A refers to the position data to control the trackwidth using the trackwidth control function. For example, the servo controller 60A controls the trackwidth using a trackwidth control function, such as a method (dynamic drift-off level [DDOL]) of inhibiting a data write operation when the offset exceeds a threshold based on the position error data of adjacent tracks, or a method (automatic trackwidth control [ATC]) of setting a target path of a write track based on the position error data of adjacent tracks to which data has already been written.

Figure 4A:
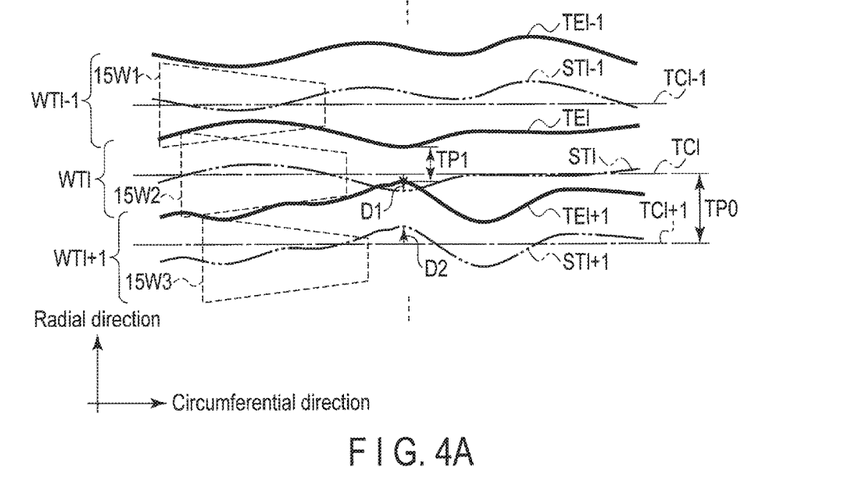
FIG. 4A is a schematic view for describing an example of DDOL.
Figure 4B:
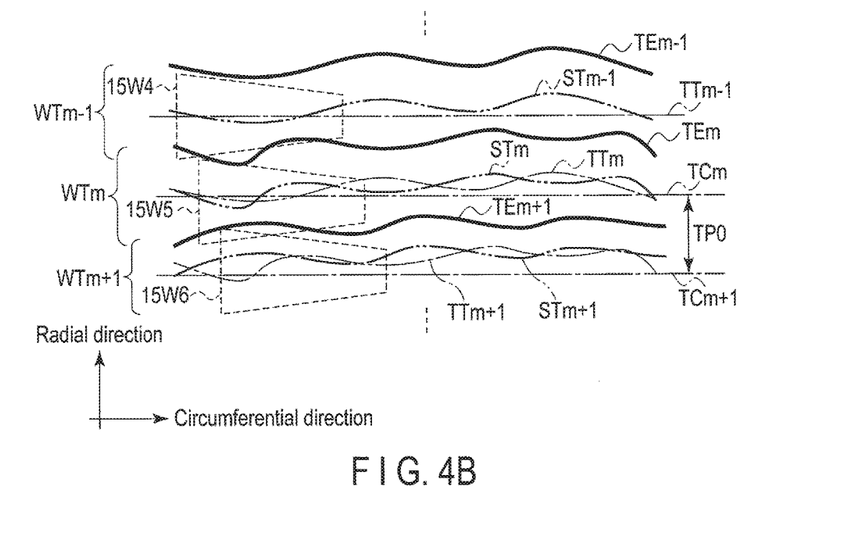
FIG. 4B is a schematic view for describing an example of ATC.

Referring now to FIGS. 4A and 4B, DDOL and ATC will be described.

FIG. 4A is a schematic view mimetic diagram showing an example of DDOL. FIG. 4A shows write tracks WTl−1, WTl and WTl+1 written to a particular band area. FIG. 4A also shows distance TP0 between track centers.

On write track WTl−1 of FIG. 4A, track center TCl−1, path STl−1 of the write head 15W assumed when writing data to write track WTl−1, track edge TEl−1 of write track WTl−1, and position 15W1 of the write head 15W assumed when writing data to write track WTl−1 are shown.

On write track WTl of FIG. 4A, track center TCl, path STl of the write head 15W assumed when writing data to write track WTl, track edge TEl of write track WTl, and position 15W2 of the write head 15W assumed when writing data to write track WTl are shown. Further, on write track WTl, trackwidth TPl at a particular position, and position error D1 of trackwidth TPl at the particular position are shown. It is assumed here that trackwidth TPl is narrower than distance TP0 between track centers.

On write track WTl+1 of FIG. 4A, track center TCl+1, path STl+1 of the write head 15W assumed when writing data to write track WTl+1, track edge TEl+1 of write track WTl+1, and position 15W3 of the write head 15W assumed when writing data to write track WTl+1 are shown. Furthermore, on write track WTl+1, trackwidth TPl at a particular position, and position error D2 of trackwidth TPl at the particular position are shown.

When writing data by shingled-write magnetic recording, the servo controller 60A controls the write head 15W (positions 15W1, 15W2 and 15W3 of the write head 15W) on write tracks WTl−1, WTl and WTl+1, using track centers TCl−1, TCl and TCl+1 as respective target paths. At this time, the write head 15W (positions 15W1, 15W2 and 15W3 of the write head 15W) actually runs (placed) on paths STl−1, STl and STl+1 as a result of the feedback control of the servo controller 60A. When writing write data to write tracks WTl−1, WTl and WTl+1, the servo controller 60A acquires position errors and writes them in, for example, the memory 61A.

At this time, if a position error in each of write tracks WTl−1, WTl and WTl+1 exceeds a particular value (first threshold) that enables a valid trackwidth between adjacent tracks to be secured, the servo controller 60A inhibits write operations. The valid trackwidth indicates a trackwidth that can be read by the read head 15R.

The servo controller 60A inhibits write operations also when the trackwidth of write track WTl written immediately before a currently written write track, which is determined from the position error of the former write track and that of the latter write track, is smaller than a valid track width (second threshold).

For example, as shown in FIG. 4A, when the servo controller 60A writes data to write track WTl+1, it controls the write head 15W (15W3) using track center TCl+1 as a target path. Actually, the servo controller 60A causes the write head 15W (15W3) to run on path STl+1. At this time, the servo controller 60A acquires a position error on path STl+1, and writes it to a recording medium, such as the memory 61A, and the disk 10. Moreover, the servo controller 60A transmits the acquired position data to the MPU 603. At this time, the servo controller 60A determines whether the acquired position error exceeds the first threshold. If the position error exceeds the first threshold, the servo controller 60A inhibits write operations.

When the position error does not exceed the first threshold, the servo controller 60A determines whether the position error has occurred close to the write track (WTl) written immediately before the currently written write track (WTl+1), or close to a subsequent write track (not shown). If determining that the position error has occurred close to the immediately before written write track (WTl), the servo controller 60A determines whether trackwidth TPl of write track WTl calculated from position error D1 on path STl and position error D2 on path STl+1 is less than the second threshold. If trackwidth TPl of write track WTl is less than the second threshold, the servo controller 60A inhibits write operations.

Utilizing the above-described DDOL, the servo controller 60A can control narrowing of the trackwidth by inhibiting write operations based on the position errors of adjacent tracks.

FIG. 4B is a schematic view showing an example of the ATC. Specifically, FIG. 4B shows write tracks WTm−1, WTm and WTm+1 held in a particular band area. FIG. 4B also shows distance TP0 between track centers.

On write track WTm−1 of FIG. 4B, track center TCm−1 (target path TTm−1), path STm−1 of the write head 15W assumed when data is written to write track WTm−1, track edge TEm−1 of write track WTm−1 written by write head 15W, and position 15W4 of the write head 15W assumed when writing write track WTm−1 are shown.

On write track WTm of FIG. 4B, track center TCm, target path TTm, path STm of the write head 15W assumed when data is written to write track WTm, track edge TEm of write track WTm written by write head 15W, and position 15W5 of the write head 15W assumed when writing write track WTm are shown.

On write track WTm+1 of FIG. 4B, track center TCm+1, target path TTm+1, path STm+1 of the write head 15W assumed when data is written to write track WTm+1, track edge TEm+1 of write track WTm+1 written by write head 15W, and position 15W6 of the write head 15W assumed when writing write track WTm+1 are shown.

On write track WTm−1 written first, the servo controller 60A controls the write head 15W (15W4) using track center TCm−1 (target path TTm−1) as a target path. At this time, as a result of feedback control of the servo controller 60A, the write head 15W (15W4) actually runs on path STm−1 obtained by including a position error in target path TTm−1. The servo controller 60A acquires a position error from write track WTm−1, and writes it to a recording medium, such as the memory 61A. Further, the servo controller 60A transmits the acquired position data to the MPU 60B.

The servo controller 60A changes the target path from track center TCm−1 to target path TTm that follows path STm−1, based on the position error of write track WTm−1. The servo controller 60A controls the write head 15W (15W5) using target path TTm. At this time, as a result of feedback control of the servo controller 60A, the write head 15W (15W4) actually runs on path STm obtained by including the position error in target path TTm. The servo controller 60A acquires a position error from write track WTm, and writes it to a recording medium, such as the memory 61A. Moreover, the servo controller 60A transmits the acquired position data to the MPU 60B.

The servo controller 60A changes the target path from track center TCm+1 to target path TTm+1 that follows path STm, based on the position error of the write track WTm. The servo controller 60A controls the write head 15W (15W6) using target path TTm+1. At this time, as a result of feedback control of the servo controller 60A, the write head 15W (15W6) actually runs on path STm+1 obtained by including a position error. The servo controller 60A acquires a position error from write track WTm+1, and writes it to a recording medium, such as the memory 61A. Moreover, the servo controller 60A transmits the acquired position data to the MPU 60B.

Utilizing the above-described ATC, the servo controller 60A can suppress narrowing of the trackwidth by controlling the trackwidth based on position error data associated with adjacent tracks. The servo controllers 60A may control the trackwidth by a method other than DDOL and ATC. For example, in thermally assisted shingled-write magnetic recording, the servo controller 60A (or the MPU 60B) may refer to position error data to thereby change the heating range of the disk 10 so as to control the trackwidth.

Moreover, both DDOL and ATC may be simultaneously applied.

When writing data in a particular band area, the servo controller 60A determines the storage destination of position data associated with the band area, and acquires the position data. At this time, based on the acquired position data, the servo controller 60A writes data to the particular band area, while controlling the trackwidth utilizing the trackwidth control function, such as DDOL and ATC. If no position data is obtained, the servo controller 60A writes data in the particular band area, while controlling the trackwidth so that a position error will not exceed a particular threshold, for example, a first threshold, using, for example, DDOL, and without using position data.

The MPU 60B is a main controller that controls each component of the magnetic disk device 1. The MPU 60B controls an operation of writing data to the disk 10, and also controls an operation of selecting a storage destination of write data transferred from the host 100. Write operations under control of the MPU 60B include shingled-write magnetic recording. Further, the MPU 60B controls an operation of reading data from the disk 10, and also controls an operation of selecting a storage destination of read data. Regarding read/write control of data of shingled-write magnetic recording, the MPU 60B may correspond to a host managed system wherein read/write control is performed by the host 100, or to a drive managed system wherein it is performed by the magnetic disk device 1. When it corresponds to the host managed system, the MPU 60B writes data to an arbitrary recording region (for example, a sector or an LBA) of a band area in accordance with a write communication from the host 100.

The MPU 60B includes a read/write controller 61B. The MPU 60B performs processing of each component on firmware.

The read/write controller 61B controls data read and write operations. The read/write controller 61B overwrites data in the particular band area or adds data to the data in this area, in accordance with a write command.

For example, the read/write controller 61B overwrites old data currently stored in the particular band area with new write data, if the position (for example, a sector or an LBA) designated by the write command is the start sector (=0) of the particular band area. At this time, the read/write controller 61B invalidates old data stored in a storage area of the particular band area other than the storage area overwritten with the new data.

For instance, if the position (for example, a sector or an LBA) designated by the write command indicates a sector positioned in the particular band area after the end sector to which data has already been written, the read/write controller 61B adds write data to the sector after the end sector. The read/write controller 61B counts a generation number whenever it performs data adding in each particular band area. The read/write controller 61B may also write the generation number in the table TB as the count of data addition through the servo controller 60A.

Figure 5A:
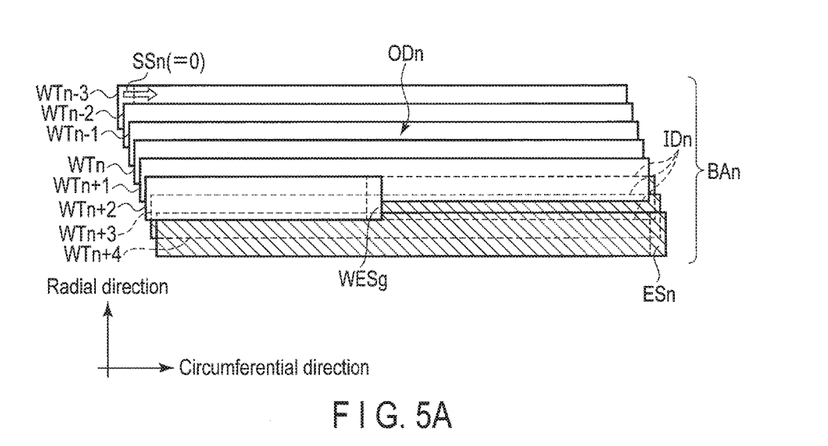
FIG. 5A is a schematic view showing an example case of adding data in a band area of shingled-write magnetic recording.
Figure 5B:
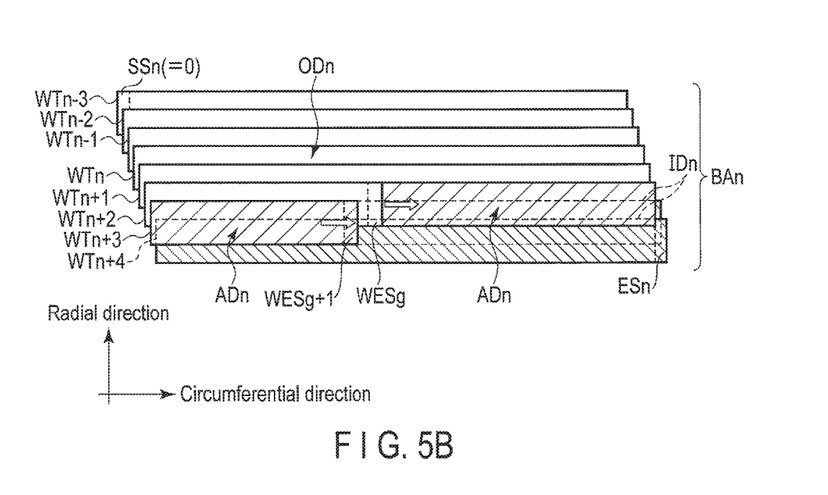
FIG. 5B is a schematic view showing another example case of adding data in a band area of shingled-write magnetic recording.

FIGS. 5A and 5B are schematic views showing an example of data addition in the band area BAn. In FIGS. 5A and 5B show write tracks WTn−3, WTn−2, WTn−1, WTn, WTn+1, WTn+2, WTn+3 and WTn+4 in the band area BAn.

FIGS. 5A and 5B also show overwrite data (new write data) ODn and invalidated old data (invalid data) IDn. FIGS. 5A and 5B further show the start sector SSn and the end sector ESn of the band area BAn, and the end sector WESg of new write data ODn. Further, FIG. 5B shows new write data ADn added after the end sector WESg of write track WTn+2, and the end sector WESg+1 of new write data ADn. In FIGS. 5A and 5B, assume that a position error will occur in each write track. Further, in FIGS. 5A and 5B, when the read/write controller 61B controls the write operation, the servo controller 60A controls the trackwidth using a trackwidth control function, such as DDOL and ATC.

As shown in FIG. 5A, if the start sector (=0) of the band area BAn is designated by a write command, the read/write controller 61B overwrites old data in the band area BAn with new write data ODn. The read/write controller 61B detects the end sector WESg of new write data ODn through the R/W channel 40. Moreover, in the band area BAn, the read/write controller 61B invalidates remaining old data (invalid data) IDn ranging from the end sector WESg of overwrite new write data ODn to the end sector ESn of the band area BAn.

Furthermore, as shown in FIG. 5B, if the write command designates a sector immediately after the end sector WESg of new write data ODn, the read/write controller 61B adds write data ADn to the sector immediately after the end sector WESg. The read/write controller 61B detects, through the R/W channel 40, the end sector WESg+1 of write data ADn added to new write data ODn.

Moreover, the read/write controller 61B writes position data, acquired through the servo controller 60A, to a sector after the end sector of currently written write data. For instance, in the particular band area, the read/write controller 61B writes position data on adjacent tracks, which includes a position error acquired in a current write operation, to a sector immediately after the end sector of the currently written write data. In addition, in the particular band area, the read/write controller 61B may write the position data to a sector after the end sector of the currently written write data, instead of writing the same to the sector immediately after the end sector.

Write Operation

Figure 6A:
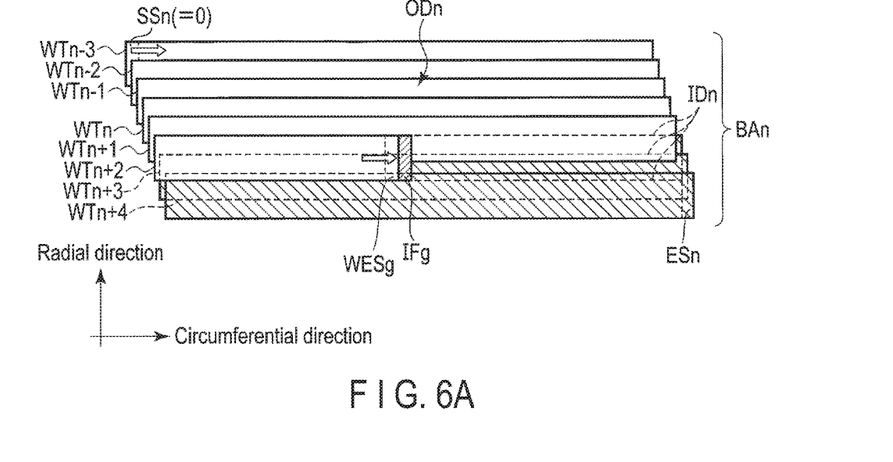
FIG. 6A is a schematic view showing an example of a write position of position data in a band area or shingled-write magnetic recording.
Figure 6B:
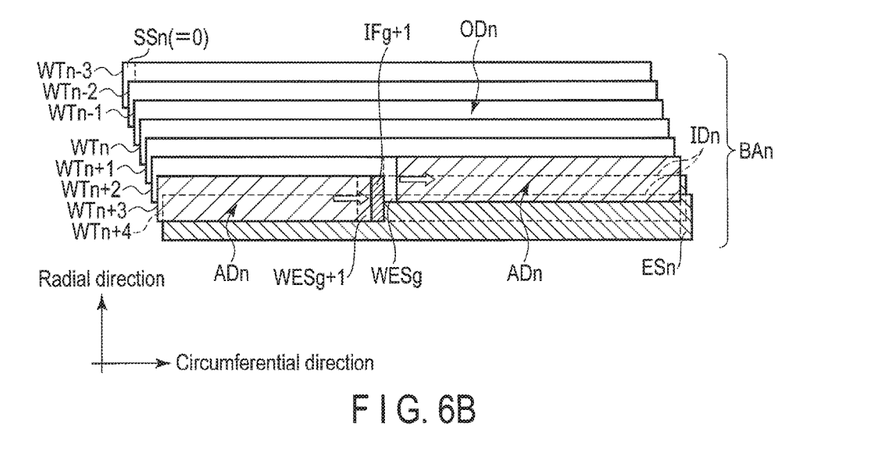
FIG. 6B is a schematic view showing another example of a write position of position data in a band area of shingled-write magnetic recording.

FIGS. 6A and 6B are schematic views showing an example of a write operation according to the embodiment. FIG. 6A substantially corresponds to FIG. 5A, but further shows position data IFg. Similarly, FIG. 6B substantially corresponds to FIG. 5B, but further shows position data IFg+1. In FIGS. 6A and 6B, it is assumed that a position error will occur in each write track.

As shown in FIG. 6A, if the start sector (=0) of the band area BAn is designated by a write command, the servo controller 60A clears the position data of the band area BAn (=all 0). When writing new write data ODn, the servo controller 60A detects position data IFg associated with entire preceding write track WTn, and part of current write track WTn+1 that is up to a current write position. The position data IFg may include all position data on the tracks of new write data ODn.

When writing new write data ODn, the servo controller 60A computes the prioritization value of the band area BAn, and compares the same with the prioritization values of other band areas held in the table TB of the memory 61A. If there is a band area having a prioritization value lower than that of the band area BAn, the servo controller 60A writes the position data IFg and the prioritization value of the band area BAn to the table TB, along with a priority corresponding to the prioritization value of the band area BAn. At this time, the servo controller 60A transmits the position data IFg to the MPU 60B.

Further, if the table TB has no free areas, and holds a band area having a prioritization value lower than that of the band area BAn, the servo controller 60A deletes, from the table TB, position data and the prioritization value of a band area, which area is lowest in valuation value among the band areas written to the table TB. After that, the servo controller 60A writes the position data IFg and the prioritization value of the band area BAn to the table TB, along with a priority corresponding to the prioritization value. At this time, the servo controller 60A transmits the position data IFg to the MPU 60B.

Further, if the table TB has no free areas, and does not hold a band area having a prioritization value lower than that of the band area BAn, the servo controller 60A transmits the position data IFg to the MPU 60B without writing the position data IFg and the prioritization value of the band area BAn to the table TB.

When writing new write data ODn, the MPU 60B writes the position data IFg, received from the servo controller 60A, to a sector immediately after the end sector WESg of new write data ODn.

When having received a write command to add data to a sector subsequent to the end sector WESg of new write data ODn, the servo controller 60A determines whether the table TB of the memory 61A holds the position data IFg of the band area BAn, and more specifically, the position error data of adjacent write track WTn+1. If the table TB of the memory 61A holds the position data IFg, the servo controller 60A acquires the position data IFg from the memory 61A.

In contrast, if the table TB does not hold the position data IFg, the servo controller 60A determines whether the position data IFg is written to the band area BAn. If the position data IFg has already been written to the band area BAn, the MPU 60B reads the position data IFg from the band area BAn of the disk 10.

Upon acquiring the position data IFg, the servo controller 60A controls the trackwidth based on the position data IFg, using a trackwidth control function, such as DDOL or ATC. In contrast, if the position data IFg cannot be acquired, the servo controller 60A controls the trackwidth using the trackwidth control function, such as DDOL or ATC, without referring to the position data IFg.

After that, as shown in FIG. 6B, the MPU 60B overwrites the position data IFg with write data ADn such that this write data and is added to a sector subsequent to the end sector WESg of new write data ODn. When adding write data ADn, the servo controller 60A detects position data IFg+1 associated with entire preceding write track WTn+1, and part of current write track WTn+2 that is Lip to a current write position. Position data IFg+1 may include all position data on the tracks of new write data ODn and the added write data.

When writing write data ADn, the servo controller 60A computes the prioritization value of the band area BAn, and compares the same with the prioritization values of other band areas held in the table TB of the memory 61A. If there is a band area having a prioritization value lower than that of the band area BAn, the servo controller 60A writes position data IFg+1 and the prioritization value of the band area BAn to the table TB, along with a priority corresponding to the prioritization value of the band area BAn. At this time, the servo controller 60A transmits position data TFg+1 to the MPU 60B.

In contrast, if the table TB has no free areas, and holds a band area having a prioritization value lower than that of the band area BAn, the servo controller 60A deletes, from the table TB, position data and the prioritization value of a band area, which area is lowest in valuation value among the band areas written to the table TB. After that, the servo controller 60A writes position data IFg+1 and the prioritization value of the band area BAn to the table TB, along with a priority corresponding to the prioritization value. At this time, the servo controller 60A transmits position data IFg+1 to the MPU 60B.

Further, if the table TB has no free areas, and does not hold a band area having a prioritization value lower than that of the band area BAn, the servo controller 60A transmits position data IFg+1 to the MPU 60B without writing position data IFg+1 and the prioritization value of the band area BAn to the table TB.

When adding write data ADn, the MPG 60B writes position data IFg+1, received from the servo controller 60A, to a sector immediately after the end sector WESg+1 of new write data ODn.

Figure 7:
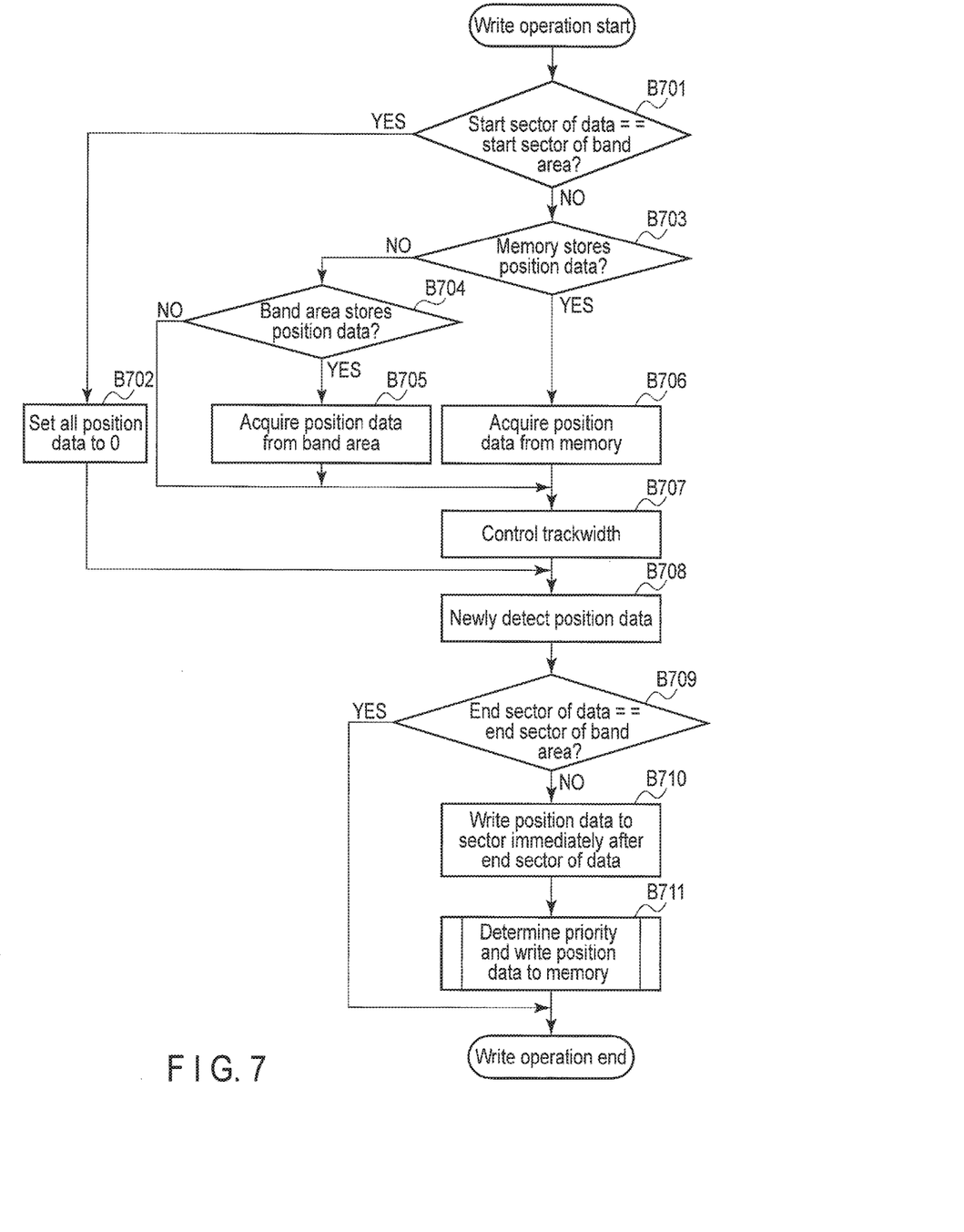
FIG. 7 is a flowchart for describing a write operation according to the embodiment.

FIG. 7 is a flowchart illustrating a write operation according to the embodiment. The servo controller 60A realizes the write operation through the MPU 60B. In the description below, it is assumed, for the sake of convenience, that the servo controller 60A performs the write operation.

The servo controller 60A determines whether the start sector of data designated by a write command is the same as the start sector of the band area (B701).

If determining that the start sector of the data is the same as that of the band area (YES in B701), the servo controller 60A clears position data (all=0) (B702).

In contrast, if determining that the start sector of the data as not the same as that of the band area (NO in B701), the servo controller 60A determines whether the memory 61A stores position data associated with a particular band area.

If determining that the memory 61A does not store the position data associated with the particular band area (NO in B703), the servo controller 60A determines whether position data exists in the particular band area (B704).

If determining that no position data exists in the particular band area (NO in B704), the servo controller 60A proceeds to B707. In contrast, if determining that the position data exists in the particular band area (YES in B704), the servo controller 60A acquires the position data from the particular band area (B705). If determining that the memory 61A stores the position data associated with the particular band area (YES in B703), the servo controller 60A acquires the position data from the memory 61A (B706).

When writing data, the servo controller 60A controls the trackwidth based on position data on an adjacent track (B707). When writing data, the servo controller 60A newly detects position data on an adjacent track from the currently executed write operation (B708). The servo controller 60A determines whether the end sector of the data is the same as the end sector of the band area (B709).

If determining that the end sector of the data is the same as that of the band area (YES in B709), the servo controller 60A finishes the write operation. If determining that the end sector of the data is not the same as that of the band area (NO in B709), the servo controller 60A writes position data to a sector immediately after the end sector of the currently written data (B710). The servo controller 60A determines the priority of the particular band area to which data has currently been written, and writes the position data to the memory 61 (B711).

Determination of Priority

Figure 8:
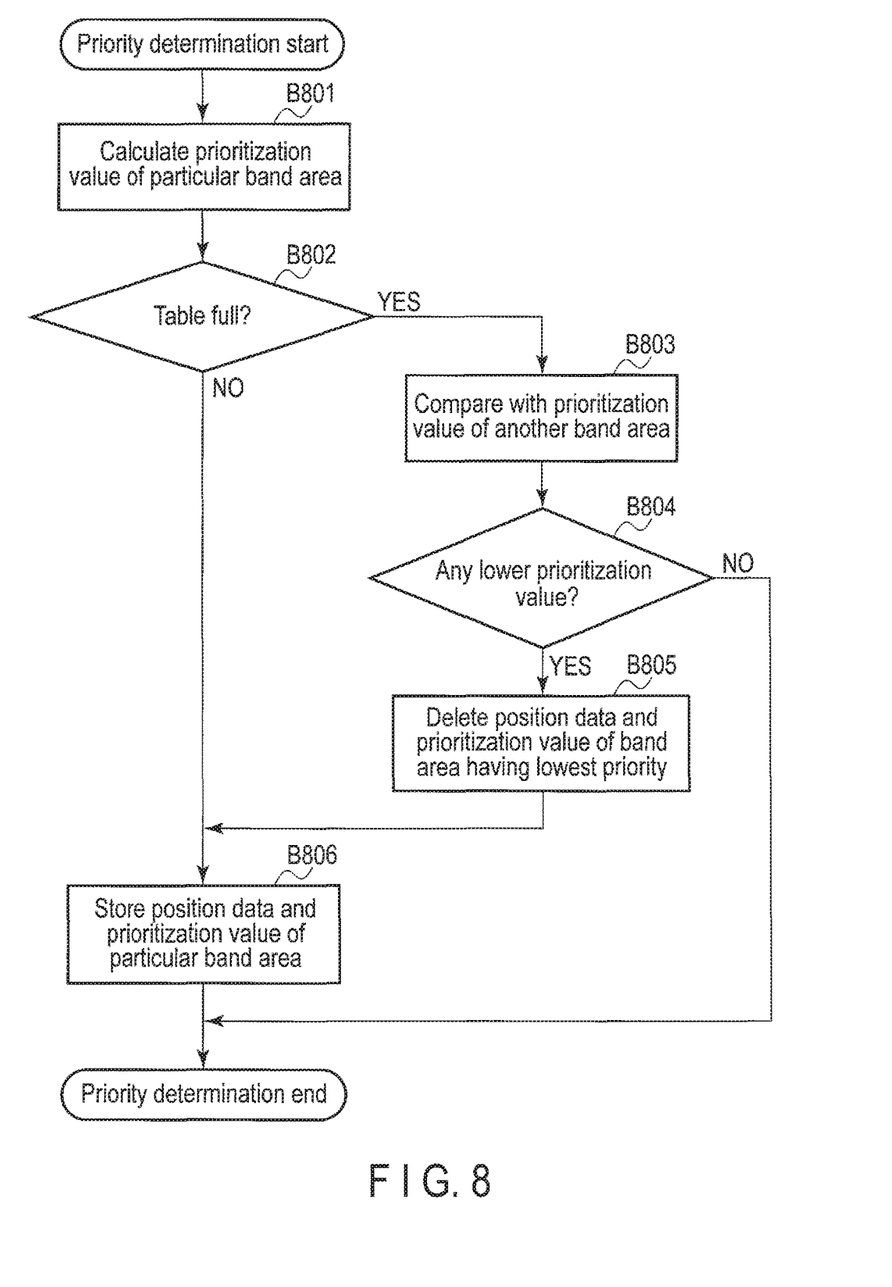
FIG. 8 is a flowchart for describing a method for determining the priority of the write operation shown in FIG. 7.

FIG. 8 is a flowchart illustrating a method of determining the priority of the write operation shown in FIG. 7. More specifically, FIG. 8 shows priority determination processing performed in B711 of FIG. 7.

The servo controller 60A computes the prioritization value of a particular band area (B801). The servo controller 60A determines whether the entire table TB of the memory 61A is filled with data (=Full) (B802). If determining that the entire table TB of the memory 61A is not full, i.e., if determining that the table TB has a free area (NO in B802), the servo controller 60A proceeds to B806.

If determining that the entire table TB of the memory 61A is full (YES in B802), the servo controller 60A compares the prioritization value of the particular band area with the prioritization values of other band areas held in the table TB of the memory 61A (B803). The servo controller 60A determines whether a band area of a prioritization value lower than that of the particular band area exists (B804). If determining that a band area of a prioritization value lower than that of the particular band area does not exist (NO in B804), the servo controller 60A finishes the priority determination.

If determining that a band area of a prioritization value lower than that of the particular band area exists (YES in B804), the servo controller 60A deletes position data associated with a band area of the lowest priority (B805). The servo controller 61A stores the position data and the prioritization value of the particular band area in the table TB of the memory 61A (B806), thereby finishing the priority determination.

If the table TB is in an area, such as the volatile memory 70, which cannot hold data when supply of power is interrupted, all data in the table TB may be saved to an area, such as the nonvolatile memory 80 or the disk 10, during interruption of power supply, and the table TB may be restored based on the saved data upon resupply of power. Alternatively, only the management table MT may be saved, and position data may be read from each band area and reconstructed.

According to the embodiment, the magnetic disk device 1 can control the trackwidth using the trackwidth control function, based on position data. The magnetic disk device 1 writes position data to the memory 61A and the disk 10. Further, the magnetic disk device 1 stores, in the memory 61A, the position data and the prioritization values of band areas having higher priorities. Upon receiving a command to add data after already written data, the magnetic disk device 1 can control the trackwidth using the trackwidth control function, based on the position data written to the memory 61A or the disk 10. As a result, even when receiving a write command to write data to an arbitrary band area, the magnetic disk device 1 can control the trackwidth and write the data, without increasing the recording area of the table TB on the memory 61A. This enables the magnetic disk device 1 to maintain input/output (I/O) performance and guarantee data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a memory;
a disk comprising a plurality of track groups each comprising a plurality of overlapping tracks;
a head comprising a write head configured to write data to the plurality of track groups, and a read head configured to read data from the plurality of track groups; and
a controller configured to write first position data, comprising a first position error of the write head with respect to a first target track, to the memory and a second recording area subsequent to a first recording area to which first data is written, when writing the first data to the track groups; to read the first position data from the memory or the second recording area when adding data after writing the first data; and to control a position of the write head based on the first position data.

2. The magnetic disk device of claim 1, wherein when adding data after writing the first data, the controller determines whether the first position data is stored in the memory, reads the first position data from the memory when the first position data is stored in the memory, and reads the first position data from the second recording area when the first position data is not stored in the memory.

3. The magnetic disk device of claim 2, wherein when adding second data after writing the first data, the controller overwrites the second recording area with the second data, and writes, to a fourth recording area subsequent to a third recording area to which the second data is written, second position data including a position error of the write head with respect to a target track to which the second data is to be written.

4. The magnetic disk device of claim 1, wherein the controller refers to the first position data, and inhibits a write operation when a second position error with respect to a second target track to which second data is to be written after the first data is written, exceeds a first threshold with which a first trackwidth of a first track written immediately before the second target track, the first trackwidth enabling the first track to be read by the read head.

5. The magnetic disk device of claim 4, wherein the controller inhibits a write operation when a second trackwidth is less than the first trackwidth, the second trackwidth being calculated from the first position error, and the second position error which occurs in a position on the first track corresponding to a position where the first position error occurred.

6. The magnetic disk device of claim 1, wherein when writing second data after writing the first data, the controller refers to the first position data, and sets a second target track based on third position data associated with a first track written immediately before the second target track.

7. The magnetic disk device of claim 1, wherein when writing data to the memory, the controller sets, in the first position data, a priority indicating an order of writing the data to the memory.

8. The magnetic disk device of claim 7, wherein the controller increases the priority in accordance with a count of data writes to each track group.

9. The magnetic disk device of claim 7, wherein the controller increases the priority in accordance with a size of a recording area of each track group to which data can be added.

10. The magnetic disk device of claim 8, wherein when the memory does not include a particular free capacity, the controller deletes fourth data having lowest priority among position data items having lower priorities than the first position data, and writes the first position data to the memory.

11. The magnetic disk device of claim 1, wherein when adding data after writing the first data, the controller writes data to an arbitrary area in the track groups in accordance with an external instruction.

12. A write method for use in a magnetic disk device comprising a memory, a disk comprising a plurality of track groups each comprising a plurality of overlapping tracks, a head comprising a write head configured to write data to the plurality of track groups, and a read head configured to read data from the plurality of track groups, the method comprising:
writing position data, comprising a first position error of the write head with respect to a first target track, to the memory and a second recording area subsequent to a first recording area to which first data is written, when writing the first data to the track groups;
reading the first position data from the memory or the second recording area when adding data after writing the first data; and
controlling a position of the write head based on the first position data.

13. The write method of claim 12, wherein when adding data after writing the first data, determining whether the first position data is stored in the memory,
reading the first position data from the memory when the first position data is stored in the memory; and
reading the first position data from the second recording area when the first position data is not stored in the memory.

14. The write method of claim 13, wherein when adding second data after writing the first data, overwriting the second recording area with the second data; and
writing, to a fourth recording area subsequent to a third recording area to which the second data is written, second position data including a position error of the write head with respect to a target track to which the second data is to be written.

15. The write method of claim 12, further comprising:
referring to the first position data; and
inhibiting a write operation when a second position error with respect to a second target track to which second data is to be written after the first data is written, exceeds a first threshold with which a first trackwidth of a first track written immediately before the second target track, the first trackwidth enabling the first track to be read by the read head.

16. The write method of claim 15, further comprising:
inhibiting a write operation when a second trackwidth is less than the first trackwidth, the second trackwidth being calculated from the first position error, and the second position error which occurs in a position on the first track corresponding to a position where the first position error occurred.

17. The write method of claim 12, wherein when writing second data after writing the first data, referring to the first position data; and
setting a second target track based on third position data associated with a first track written immediately before the second target track.

18. The write method of claim 12, wherein when writing data to the memory, setting, in the first position data, a priority indicating an order of writing the data to the memory.

19. The write method of claim 18, further comprising:
increasing the priority in accordance with a count of data writes to each track group.

20. The write method of claim 18, further comprising:
increasing the priority in accordance with a size of a recording area of each track group to which data can be added.

* * * * *